United States Patent
Lemley et al.

(10) Patent No.: US 11,314,324 B2
(45) Date of Patent: *Apr. 26, 2022

(54) NEURAL NETWORK IMAGE PROCESSING APPARATUS

(71) Applicant: FotoNation Limited, Galway (IE)

(72) Inventors: Joseph Lemley, Galway (IE); Liviu-Cristian Dutu, Bucharest (RO); Stefan Mathe, Bucharest (RO); Madalin Dumitru-Guzu, Bucharest (RO); Dan Filip, Bucharest (RO)

(73) Assignee: FotoNation Limited, Galway (IE)

(*) Notice: Subject to any disclaimer, the term of this patent is extended or adjusted under 35 U.S.C. 154(b) by 178 days.

This patent is subject to a terminal disclaimer.

(21) Appl. No.: 16/780,775

(22) Filed: Feb. 3, 2020

(65) Prior Publication Data

US 2020/0342212 A1 Oct. 29, 2020

Related U.S. Application Data

(63) Continuation-in-part of application No. PCT/EP2019/060596, filed on Apr. 25, 2019.

(51) Int. Cl.
*G06F 3/01* (2006.01)
*G06K 9/00* (2022.01)
(Continued)

(52) U.S. Cl.
CPC ......... *G06F 3/013* (2013.01); *G06K 9/00248* (2013.01); *G06K 9/00255* (2013.01);
(Continued)

(58) Field of Classification Search
CPC .............. G06F 3/013; G06K 9/00255; G06K 9/00604; G06K 9/2018; G06K 9/42;
(Continued)

(56) References Cited

U.S. PATENT DOCUMENTS 6,128,398 A 10/2000 Kuperstein et al.
8,130,281 B2 3/2012 Kaneda et al.
(Continued)

FOREIGN PATENT DOCUMENTS

EP 2743117 A1 6/2014
EP 3101622 A3 12/2016
(Continued)

OTHER PUBLICATIONS

Piratla, NM, et al., "A neural network based real-time gaze tracker," Journal of Network and Computer Applications (2002) 25, 179-196.*

(Continued)

*Primary Examiner* — Xuemei G Chen
(74) *Attorney, Agent, or Firm* — Lee & Hayes, P.C.

(57) ABSTRACT

A neural network image processing apparatus arranged to acquire images from an image sensor and to: identify a ROI containing a face region in an image; determine at plurality of facial landmarks in the face region; use the facial landmarks to transform the face region within the ROI into a face region having a given pose; and use transformed landmarks within the transformed face region to identify a pair of eye regions within the transformed face region. Each identified eye region is fed to a respective first and second convolutional neural network, each network configured to produce a respective feature vector. Each feature vector is fed to respective eyelid opening level neural networks to obtain respective measures of eyelid opening for each eye region. The feature vectors are combined and to a gaze angle neural network to generate gaze yaw and pitch values substantially simultaneously with the eyelid opening values.

25 Claims, 7 Drawing Sheets

(51) Int. Cl.
  *G06K 9/62* (2022.01)
  *G06K 9/66* (2006.01)
  *G06N 3/08* (2006.01)
  *G06K 9/20* (2006.01)
  *G06K 9/42* (2006.01)

(52) U.S. Cl.
  CPC ..... *G06K 9/00281* (2013.01); *G06K 9/00604* (2013.01); *G06K 9/2018* (2013.01); *G06K 9/42* (2013.01); *G06K 9/6217* (2013.01); *G06K 9/6256* (2013.01); *G06K 9/66* (2013.01); *G06N 3/08* (2013.01)

(58) Field of Classification Search
  CPC .............. G06K 9/6256; G06K 9/00248; G06K 9/00281; G06K 9/6217; G06K 9/66; G06K 9/00845; G06N 3/08
  See application file for complete search history.

(56) References Cited

U.S. PATENT DOCUMENTS

| | | | |
|---|---|---|---|
| 8,952,819 B2* | 2/2015 | Nemat-Nasser | G08B 21/06 340/575 |
| 9,818,024 B2 | 11/2017 | Bacivarov et al. | |
| 10,048,749 B2 | 8/2018 | Miao et al. | |
| 10,157,313 B1 | 12/2018 | Zhang et al. | |
| 2002/0102024 A1 | 8/2002 | Jones et al. | |
| 2003/0202685 A1 | 10/2003 | Shimizu et al. | |
| 2008/0126281 A1 | 5/2008 | Kisacanin | |
| 2008/0317378 A1 | 12/2008 | Steinberg et al. | |
| 2011/0235919 A1 | 9/2011 | Morita et al. | |
| 2014/0055554 A1* | 2/2014 | Du | G06K 9/00268 348/14.07 |
| 2015/0256741 A1* | 9/2015 | Towal | G06K 9/00597 348/222.1 |
| 2017/0372487 A1 | 12/2017 | Lagun et al. | |
| 2018/0035082 A1* | 2/2018 | Patil | G06T 7/246 |
| 2018/0039846 A1 | 2/2018 | Grubb et al. | |
| 2018/0314881 A1 | 11/2018 | Sud et al. | |
| 2019/0043216 A1 | 2/2019 | Yabuuchi et al. | |
| 2019/0246036 A1 | 8/2019 | Wu et al. | |
| 2019/0251707 A1 | 8/2019 | Gupta et al. | |
| 2019/0259174 A1 | 8/2019 | De Villers-Sidani et al. | |
| 2019/0279393 A1 | 9/2019 | Ciuc et al. | |
| 2019/0303656 A1 | 10/2019 | Lin | |
| 2019/0303724 A1 | 10/2019 | Linden | |
| 2019/0325200 A1 | 10/2019 | Qian et al. | |
| 2019/0354178 A1 | 11/2019 | Hwang | |
| 2019/0370577 A1 | 12/2019 | Meng et al. | |
| 2019/0370580 A1 | 12/2019 | Aoi et al. | |

FOREIGN PATENT DOCUMENTS

| | | | |
|---|---|---|---|
| EP | 3539054 A1 * | 9/2019 | ......... G06K 9/00248 |
| WO | 2017/032468 A1 | 3/2017 | |
| WO | 2017/108222 A1 | 6/2017 | |
| WO | 2017/129325 A1 | 8/2017 | |

OTHER PUBLICATIONS

S. Baluja and D. Pomerleau, "Non-intrusive gaze tracking using artificial neural networks," Pittsburgh, PA, USA, Tech. Rep., 1994, pp. 753-760.

M. Kim, O. Wang and N. Ng "Convolutional Neural Network Architectures for Gaze Estimation on Mobile Devices", Stanford Reports, 2017, (www://cs231n.stanford.edu/reports/2017/pdfs/229.pdf), 7 pages.

A. George and A. Routray, "Real-time eye gaze direction classification using convolutional neural network," in 2016 International Conference on Signal Processing and Communications (SPCOM), Jun. 2016, pp. 1-5.

Flavio Luiz Coutinho, Carlos H. Morimoto: "Augmenting the robustness of cross-ratio gaze tracking methods to head movement", Association for Computing Machinery, Inc., ETRA 2012, Santa Barbara, CA, Mar. 28-30, 2012, pp. 59-66.

Kyle Krafka, Aditya Khosla, Petr Kellnhofer, Harini Kannan, Suchendra Bhandarkar, Wojciech Matusik, Antonio Torralba: "Eye Tracking for Everyone", 9 pages.

Erroll Wood, Tadas Baltrusaitis, Louis-Philippe Morency, Peter Robinson, Andreas Bulling: "Learning an appearance-based gaze estimator from one million synthesised images" ETRA '16, Mar. 14-17, 2016, Charlston, SC, USA, 8 pages.

Yunyang Li, Xin Xu, Nan Mu, and Li Chen: "Eye-Gaze Tracking System by Haar Cascade Classifier", 2016 IEEE 11th Conference on Industrial Electronics and Applications (ICIEA), 978-1-4673-8644—Sep. 2016, pp. 564-567.

Daniel González-Jiménez and José Luis Alba-Castro: "Shape-Driven Gabor Jets for Face Description and Authentication", IEEE Transactions on Information Forensics and Security, vol. 2, No. 4, Dec. 2007, pp. 769-780.

Nanxiang Li and Carlos Busso, "User-Independent Gaze Estimation by Exploiting Similarity Measures in the Eye Pair Appearance Eigenspace", ICMI'14, Nov. 12-16, 2014, Istanbul, Turkey, ACM 978-1-4503-2885—Feb. 14, 2011, pp. 335-338.

Joseph Lemley, Anuradha Kar, and Peter Corcoran: "Real-Time Eye Gaze Estimation on Low Power Consumer Devices in the Wild with Deep Learning", IEEE Transactions on Consumer Electronics, Mar. 2, 2018, pp. 1-10.

Arantxa Villanueva, Victoria Ponz, Laura Sesma-Sanchez, Mikel Ariz, Sonia Porta, and Rafael Cabeza, Hybrid Method Based on Topography for Robust Detection of Iris Center and Eye Corners, ACM Transactions on Multimedia Computing, Communications and Applications, vol. 9, No. 4, Article 25, Publication date: Aug. 2013, 20 pages.

Elias Daniel Guestrin and Moshe Eizenman, "General Theory of Remote Gaze Estimation Using the Pupil Center and Corneal Reflections", IEEE Transactions on Biomedical Engineering, vol. 53, No. 6, Jun. 2006, pp. 1124-1133.

Dan Witzner Hansen and Qiang Ji "In the Eye of the Beholder: A Survey of Models for Eyes and Gaze", IEEE Transactions on Pattern Analysis and Machine Intelligence, vol. 32, No. 3, Mar. 2010, pp. 478-500.

U. Weidenbacher, G. Layher, P.-M. Strauss and H. Neumann, "A Comprehensive Head Pose and Gaze Database", Conference Paper—Oct. 2007, IEEE Xplore, ResearchGate, 5 pages.

Pieter Blignaut: "Mapping the Pupil-Glint Vector to Gaze Coordinates in a Simple Video-Based Eye Tracker", Journal of Eye Movement Research, 7(1):4, 2014, pp. 1-11.

Xuemei Wu, Jing Li, Qiang Wu, and Jiande Sun: "Appearance-Based Gaze Block Estimation via CNN Classification", 978-1-5090-3649—Mar. 2017, 2017 IEEE, 5 pages.

Joseph Lemley, Shabab Bazrafkan and Peter Corcoran: "Smart Augmentation Learning an Optimal Data Augmentation Strategy", 2017 IEEE, vol. 5, pp. 5858-5868.

Kenneth Alberto Funes Mora, Florent Monay, and Jean-Marc Odobez: "EYEDIAP: A Database for the Development and Evaluation of Gaze Estimation Algorithms from RGB and RGB-D Cameras", 2014 Symposium on Eye Tracking Research & Applications 2014, 4 pages.

Chunfei Ma, Kang-A Choi, Byeong-Doo Choi, Sung-Jea Ko: "Robust Remote Gaze Estimation Method Based on Multiple Geometric Transforms", Korea University, Department of Electrical Engineering, Seoul, Korea, 20 pages.

Lecun, et al,: "Backpropagation Applied to Handwritten Zip Code Recognition", Neural Computation 1, 1989, MIT, pp. 541-551.

Cagatay Murat Yilmaz, Cemal Kose: "Local Binary Pattern Histogram Features for onscreen Eye-Gaze Direction Estimation and a Comparison of Appearance Based Methods", 978-1-5090-1288—Jun. 2016, 2016 IEEE, pp. 693-696.

Hu-chuan Lu, Chao Wang, Yen-wei Chen: "Gaze Tracking by Binocular Vision and LBP Features" 978-1-4244-2175—Jun. 2008, 2008 IEEE, 4 pages.

Dmitri Model and Moshe Eizenman "User-Calibration-Free Remote Eye-Gaze Tracking System With Extended Tracking Range"., Depart-

(56) References Cited

OTHER PUBLICATIONS ment of Electrical and Computer Engineering, Institute of Biomaterials and Biomedical Engineering, Department of Ophthalmology and Vision Sciences, University of Toronto, 4 pages.

Joseph Lemley, Shabab Bazrafkan and Peter Corcoran: "Transfer Learning of Temporal Information for Driver Action Classification" MAICS 2017, pp. 123-128.

Chi Jian-nan, Zhang Chuang, Yan Yan-tao, Liu Yang, Zhang Han: "Eye Gaze Calculation Based on nonlinear polynomial and Generalized Regression Neural Network", 2009 Fifth International Conference on Natural Computation, 978-0-7695-3736—Aug. 2009 IEEE, pp. 617-623.

Takehiko Ohno and Naoki Mukawa: "A Free-head, Simple Calibration, Gaze Tracking System That Enables Gaze-Based Interaction", Proceeding of the symposium on ETRA 2004; eye tracking research and applications symposium, pp. 115-122.

Qiuhai He, Xiaopeng Hong, Xiujuan Chai, Jukka Holappa, Guoying Zhao, Xilin Chen and Matti Pietikäinen: "OMEG: Oulu Multi-Pose Eye Gaze Dataset", Springer International Publishing Switzerland 2015, R.R. Paulsen and K.S. Pedersen (Eds.): SCIA 2015, LNCS 9127, pp. 418-427, DOI: 10.1007/978-3-319-19665-7_35.

Xucong Zhang, Yusuke Sugano, Andreas Bulling: :Everyday Eye Contact Detection Using Unsupervised Gaze Target Discovery, UIST 2017, Oct. 22-25, 2017, Quebec City, QC, Canada, ACM 978-1-4503-4981—Sep. 17, 2010, pp. 193-203.

Kang Wang and Qiang Ji: "Real Time Eye Gaze Tracking with Kinect", 2016 23rd International Conference on Pattern Recognition (ICPR), Cancún Center, Cancún, México, Dec. 4-8, 2016, 978-1-5090-4847—Feb. 16, 2016 IEEE, pp. 2752-2757.

Christopher D. McMurrough, Vangelis Metsis, Jonathan Rich, Fillia Makedon: An Eye Tracking Dataset for Point of Gaze Detection, ETRA 2012, Santa Barbara, CA, Mar. 28-30, 2012, ACM 978-1-4503-1225-7/12/0003, pp. 305-308.

Takashi Nagamatsu, Junzo Kamahara, Naoki Tanaka: "Calibration-free Gaze Tracking Using a Binocular 3D Eye Model", CHI 2009 ~ Spotlight on Works in Progress ~ Session 1, Apr. 4-9, 2009 ~ Boston, MA, USA, ACM 978-1-60558-247—Apr. 9, 2004, pp. 3613-3618.

Xucong Zhang, Yusuke Sugano, Mario Fritz, Andreas Bulling: "Appearance-Based Gaze Estimation in the Wild", IEEE Conference on Computer Vision and Pattern Recognition (CVPR), Jun. 2015, pp. 4511-4520.

Laura Florea, Corneliu Florea, Ruxandra Vrânceanu, Constantin Vertan: "Can Your Eyes Tell Me How You Think? A Gaze Directed Estimation of the Mental Activity", 2013 11 pages.

Zhiwei Zhu, Qiang Ji, Kristin P. Bennett: "Nonlinear Eye Gaze Mapping Function Estimation via Support Vector Regression", Proceedings of the 18th International Conference on Pattern Recognition (ICPR'06), 0-7695-2521-0/06, 2006, IEEE, 4 pages.

Seung-Jin Baek, Kang-A Choi, Chunfei Ma, Young-Hyun Kim, and Sung-Jea Ko: "Eyeball Model-based Iris Center Localization for Visible Image-based Eye-Gaze Tracking Systems", 0098 3063/13/, 2013 IEEE, pp. 415-421.

Yafei Wang, Tianyi Shen, Guoliang Yuan, Jiming Bian, Xianping Fu: "Appearance-based gaze estimation using deep features and random forest regression" Knowledge-Based Systems 110 (2016), 0950-7051/, 2016 Elsevier B.V. pp. 293-30.

Anuradha Kar, and Peter Corcoran: "A Review and Analysis of Eye-Gaze Estimation Systems, Algorithms and Performance Evaluation Methods in Consumer Platforms", vol. 5, 2017 IEEE, pp. 16495-16519.

Stylianos Asteriadis, Dimitris Soufleros, Kostas Karpouzis, Stefanos Kollias: "A Natural Head Pose and Eye Gaze Dataset", AFFINE '09, Nov. 6, 2009, ACM 978-1-60558-692-2—Jan. 9, 2011, 4 pages.

Joseph Lemley, Shabab Bazrafkan, Peter Corcoran: "Learning data Augmentation for Consumer Devices and Services", 2018 IEEE International Conference on Consumer Electronics (ICCE), 978-1-5386-3025—Sep. 2018, 3 pages.

Georgescu and Stec: U.S. Appl. No. 15/879,310, filed Jan. 24, 2018 entitled :Method and System for Correcting a Distorted Input Image.

Ciuc, et al., U.S. Appl. No. 15/912,946, filed Mar. 6, 2018 entitled: "Facial Features Tracker With Advanced Training for Natural Rendering of Human Faces in Real-Time".

Bigioi, et al., U.S. Appl. No. 62/592,665, filed Nov. 30, 2017 entitled :Peripheral Processing Device.

Munteanu, U.S. Appl. No. 15/955,426, filed Apr. 17, 2018 entitled "Neural Network Engine".

S Deepthi Iyer and Hariharan Ramasangu: "Hybrid LASSO and Neural Network Estimator for Gaze Estimation", 2016 IEEE, 978-1-5090-2597—Aug. 2016, pp. 2579-2582.

Anjith George and Aurobinda Routray: "Fast and accurate algorithm for eye localisation for gaze tracking in low-resolution images", IET Comput. Vis., 2016, vol. 10 Iss. 7, pp. 660-669.

www.//dlib.net/face_landmark_detection.py.html.

Hyunsung Park and Daijin Kim, "Gaze Classification on a Mobile Device by using Deep Belief Networks", 2015 3rd IAPR Asian Conference on Pattern Recognition, IEEE, pp. 685-689.

Tadas Baltrusaitis, Peter Robinson, Louis-Philippe Morency: "OpenFace: an open source facial behavior analysis toolkit" 10 pages.

Yang Fu and Wei-Ping Zhu, Daniel Massicotte, "A Gaze Tracking Scheme with Low Resolution Image", 2013 IEEE, 4 pages.

Sheng-Wen Shih and Jin Liu, "A Novel Approach to 3-D Gaze Tracking Using Stereo Cameras", IEEE Transactions on Systems, Man, and Cybernetics—Part B: Cybernetics, vol. 34, No. 1, Feb. 2004, pp. 234-245.

David Beymer and Myron Flickner, "Eye Gaze Tracking Using an Active Stereo Head", Proceedings of the 2003 IEEE Computer Society Conference on Computer Vision and Pattern Recognition (CVPR'03), 8 pages.

Shuo Chen, Chengjun Liu, "Eye detection using discriminatory Haar features and a new efficient SVM", Image and Vision Computing 33 (2015) 68-77.

R. Konrad, S. Shrestha, and P. Varma, "Near-eye display gaze tracking via convolutional neural networks."

Jianzhong Wang, Guangyue Zhang and Jiadong Shi, "2D Gaze Estimation Based on Pupil-Glint Vector Using an Artificial Neural Network", Appl. Sci. 2016, 6, 174; 17 pages.

Xiaolong Zhou, Haibin Cai, Zhanpeng Shao, Hui Yu and Honghai Liu, "3D Eye Model-Based Gaze Estimation from A Depth Sensor", Proceedings of the 2016 IEEE, International Conference on Robotics and Biomimetics, Qingdao, China, Dec. 3-7, 2016, 6 pages.

Qiong Huang, Ashok Veeraraghavan, Ashutosh Sabharwal, "TabletGaze: dataset and analysis for unconstrained appearance based gaze estimation in mobile tablets", Machine Vision and Applications (2017) 28:445-461, 17 pages.

Yu-Tzu Lin, Ruei-Yan Lin, Yu-Chih Lin, Greg C. Lee, "Real-time eye-gaze estimation using a low-resolution webcam", Multimed Tools Appl (2013) 65:543-568.

Karen Simonyan & Andrew Zisserman, "Very Deep Convolutional Networks for Large-Scale Image Recognition", conference paper at ICLR 2015, 14 pages.

Chi Zhang, Rui Yao, and Jinpeng Cai, "Efficient Eye Typing with 9-direction Gaze Estimation", arXiv:1707.00548v1 [cs.CV] Jul. 3, 2017, 9 pages.

Siqi Nie, Meng Zheng, Qiang Ji, "Deep Regression Bayesian Network and Its Applications" arXiv:1710.04809v1 [cs.LG] Oct. 13, 2017, 14 pages.

Shabab Bazrafkan, Student, IEEE, Hossein Javidnia, Student, IEEE and Peter Corcoran, "Face Synthesis with Landmark Points from Generative Adversarial Networks and Inverse Latent Space Mapping", 5 pages.

Yi-Leh Wu & Chun-Tsai Yeh &Wei-Chih Hung & Cheng-Yuan Tang, "Gaze direction estimation using support vector machine with active appearance model", Multimed Tools Appl (2014) 70, 2037-2062.

Timo Schneider, Boris Schauerte, and Rainer Stiefelhagen, "Manifold Alignment for Person Independent Appearance-based Gaze Estimation", 2014 22nd International Conference on Pattern Recognition, IEEE, pp. 1167-1172.

(56) References Cited

OTHER PUBLICATIONS

Ashish Tawari and Mohan M. Trivedi, "Robust and Continuous Estimation of Driver Gaze Zone by Dynamic Analysis of Multiple Face Videos", 2014 IEEE Intelligent Vehicles Symposium (IV), Jun. 8-11, 2014. Dearborn, Michigan, USA, 978-1-4799-3637—Mar. 2014, 2014 IEEE, pp. 344-349.
International Search Report and Written Opinion for International Application No. PCT/EP2019/060596, Completed May 21, 2019, dated May 29, 2019, 16 pgs.
Amer Al-Rahayfeh et al: "Eye Tracking and Head Movement Detection: A State-of-Art Survey", IEEE Journal of Translational Engineering in Health and Medicine, vol. 1, 2013, pp. 1-12, XP055590704, DOI: 10.1109/JTEHM.2013.2289879, section III.C "Car Assistant Systems".
Joseph Lemley et al: "Efficient CNN Implementation for Eye-Gaze Estimation on Low-Power/Low-Quality Consumer Imaging Systems," Jun. 28, 2018 (Jun. 28, 2018), XP055590709, Retrieved from the Internet: URL:https://arxiv.org/pdf/1806.10890.pdf [retrieved on May 21, 2019].
K. Ruhland, C. E. Peters, S. Andrist, J. B. Badler, N. I. Badler, M. Gleicher, B. Mutlu and R. McDonnell, "A Review of Eye Gaze in Virtual Agents, Social Robotics and HCI: Behaviour Generation, User Interaction and Perception", Computer Graphics Forum, vol. 00 (2015), No. 0 pp. 1-28, 2015 The Eurographics Association and John Wiley & Sons Ltd. Published by John Wiley & Sons Ltd., DOI: 10.1111/cgf.12603.
Rizwan Ali Naqvi, Muhammad Arsalan, Ganbayar Batchuluun, Hyo Sik Yoon and Kang Ryoung Park, "Deep Learning-Based Gaze Detection System for Automobile Drivers Using a NIR Camera Sensor", Sensors 2018, 18, 456; doi:10.3390/s18020456, www.mdpi.com/journal/sensors, 34 pages.
Ashish Shrivastava, Tomas Pfister, Oncel Tuzel, Josh Susskind, Wenda Wang, Russ Webb: "Learning from Simulated and Unsupervised Images through Adversarial Training", Computer Vision Foundation, 2017, IEEE, pp. 2107-2116.
Erroll Wood and Andreas Bulling: "EyeTab: Model-based gaze estimation on unmodified tablet computers", University of Cambridge, Max Planck Institute for Informatics, 4 pages.
Jie Zhu, Jie Yang: "Subpixel Eye Gaze Tracking",Carnegie Mellon University, 6 pages.
Yusuke Sugano, Yasuyuki Matsushita, Yoichi Sato: "Learning-by-Synthesis for Appearance-based 3D Gaze Estimation", The University of Tokyo, Microsoft Research Asia, 8 pages.
Marc Tonsen, Julian Steil, Yusuke Sugano, Andreas Bulling: "InvisibleEye: Mobile Eye Tracking Using Multiple Low-Resolution Cameras and Learning-Based Gaze Estimation", Proceedings of the ACM on Interactive, Mobile, Wearable and Ubiquitous Technologies, vol. 1, No. 3, Article 106, 2474-9567/2017/9-ART106, DOI: 10.1145/3130971, 21 pages.
Xucong Zhang, Yusuke Sugano, Mario Fritz, Andreas Bulling: "MPIIGaze: Real-World Dataset and Deep Appearance-Based Gaze Estimation", Transactions on Pattern Analysis and Machine Intelligence, DOI 10.1109/TPAMI.2017.2778103, IEEE, 14 pages.
Vytautas Vaitukaitis and Andreas Bulling: "Eye Gesture Recognition on Portable Devices", UbiComp '12, Sep. 5-Sep. 8, 2012, Pittsburgh, USA, ACM 978-1-4503-1224-0/Dec. 2009, 4 pages.
Paul Viola and Michael Jones: "Rapid Object Detection using a Boosted Cascade of Simple Features", Accepted Conference on Computer Vision and Pattern Recognition 2001, 9 pages.
Erroll Wood,Tadas Baltrusaitis, Xucong Zhang, Yusuke Sugano, Peter Robinson, Andreas Bulling: "Rendering of Eyes for Eye-Shape Registration and Gaze Estimation", Computer Vision Foundation, IEEE, 2015, 9 pages.
Yulan Liang, Michelle L. Reyes, and John D. Lee: "Real-Time Detection of Driver Cognitive Distraction Using Support Vector Machines", IEEE Transactions on Intelligent Transportation Systems, vol. 8, No. 2, Jun. 2007,1524-9050, pp. 340-350.
Zhiwei Zhu and Qiang Ji: "Novel Eye Gaze Tracking Techniques Under Natural Head Movement", IEEE Transactions on Biomedical Engineering, vol. 54, No. 12, Dec. 2007. pp. 2246-2260.
Haoping Deng and Wangjiang Zhu: "Monocular Free-head 3D Gaze Tracking with Deep Learning and Geometry Constraints", Computer Vision Foundation, 2017, IEEE Xplore, 10 pages.

\* cited by examiner

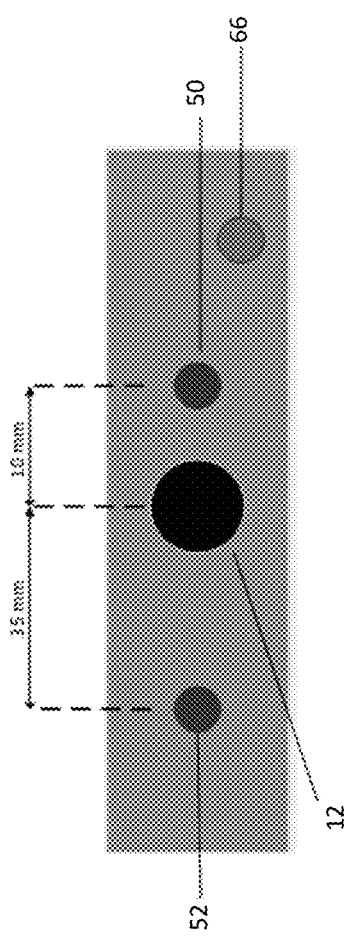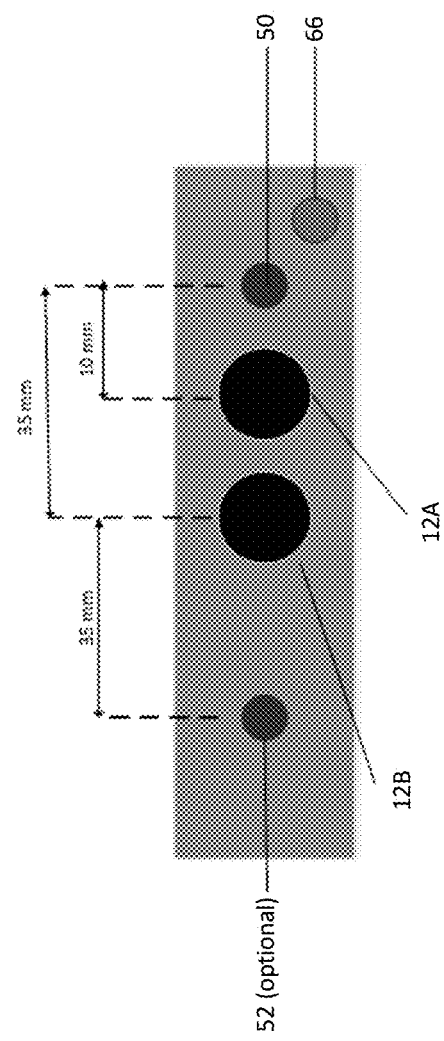

NEURAL NETWORK IMAGE PROCESSING APPARATUS

FIELD

The present invention relates to a neural network image processing apparatus.

BACKGROUND

There is a need for eye gaze tracking applications and gaze-based human computer interactions for dynamic platforms such as driver monitoring systems and handheld devices. For an automobile driver, eye based cues such as levels of gaze variation, speed of eyelid movements and eye closure can be indicative of a driver's cognitive state. These can be useful inputs for intelligent vehicles to understand driver attentiveness levels, lane change intent, and vehicle control in the presence of obstacles to avoid accidents. Handheld devices like smartphones and tablets may also employ gaze tracking applications wherein gaze may be used as an input modality for device control, activating safety features and controlling user interfaces.

The most challenging aspect of such gaze applications includes operation under dynamic user conditions and unconstrained environments. Further requirements for implementing a consumer-grade gaze tracking system include real-time high-accuracy operation, minimal or no calibration, and robustness to user head movements and varied lighting conditions.

Traditionally, gaze estimation has been done using architectures based on screen light reflection on the eye where corneal reflections from light can be used to estimate point-of-gaze.

Neural networks have also been applied to the problem and S. Baluja and D. Pomerleau, "Non-intrusive gaze tracking using artificial neural networks," Pittsburgh, Pa. USA, Tech. Rep., 1994 discloses using a neural network to map gaze coordinates to low quality cropped eye images.

Kyle Krafka, Aditya Khosla, Petr Kellnhofer, Harini Kannan, Suchendra Bhandarkar, Wojciech Matusik, Antonio Torralba, "Eye Tracking for Everyone" discloses an appearance based convolutional neural network (CNN) based model that uses face landmarks to crop an image into left and right regions. The eye regions and face are then passed to distinct neural networks which output into shared fully connected layers to provide a gaze prediction.

Similarly, M. Kim, O. Wang and N. Ng "Convolutional Neural Network Architectures for Gaze Estimation on Mobile Devices", Stanford Reports, 2017, referring to Krafka also uses separate eye regions extracted from a face region as well as a histogram of gradients map to provide a gaze prediction.

Rizwan Ali Naqvi, Muhammad Arsalan, Ganbayar Batchuluun, Hyo Sik Yoon and Kang Ryoung Park, "Deep Learning-Based Gaze Detection System for Automobile Drivers Using a NIR Camera Sensor", Sensors 2018, 18, 456 discloses capturing a driver's frontal image, detecting face landmarks using a facial feature tracker, obtaining face, left and right eye images, calculating three distances based on three sets of feature vectors and classifying a gaze zone based on the three distances.

X. Zhang, Y. Sugano, M. Fritz, and A. Bulling in both "Appearance-based gaze estimation in the wild," in IEEE Conference on Computer Vision and Pattern Recognition (CVPR), June 2015, pp. 4511-4520 and "MPIIGaze: Real-World Dataset and Deep Appearance-Based Gaze Estimation" IEEE Transactions on Pattern Analysis and Machine Intelligence, 2017, disclose using face detection and facial landmark detection methods to locate landmarks in an input image obtained from a calibrated monocular RGB camera. A generic 3D facial shape model is fitted to estimate a 3D pose of a detected face and to crop and warp the head pose and eye images to a normalised training space. A CNN is used to learn the mapping from the head poses and eye images to gaze directions in the camera coordinate system.

SUMMARY

According to the present invention there is provided a neural network image processing apparatus as claimed in claim 1.

Embodiments substantially simultaneously provide gaze and eyelid opening estimates from both eyes of a detected face within an image.

Embodiments comprise an integrated network where the weights for the various layers are determined once in the same training process to provide eyelid and gaze estimation values—this training can mean that each component (opening, gaze) of the network boosts the other as eyelid opening information can help the system learn more efficiently how to predict gaze, and vice-versa.

There is no need to manually weight gaze angles calculated for separate eye regions and so this reduces human intervention and favours a pure machine learning approach.

BRIEF DESCRIPTION OF THE DRAWINGS

An embodiment of the invention will now be described, by way of example, with reference to the accompanying drawings, in which:

FIG. 6 illustrates an image sensor and associated light sources employed in a further implementation of the present invention;

FIG. 7 illustrates a still further variation of image sensors and associated light sources;

DESCRIPTION OF THE EMBODIMENT

Figure 1:
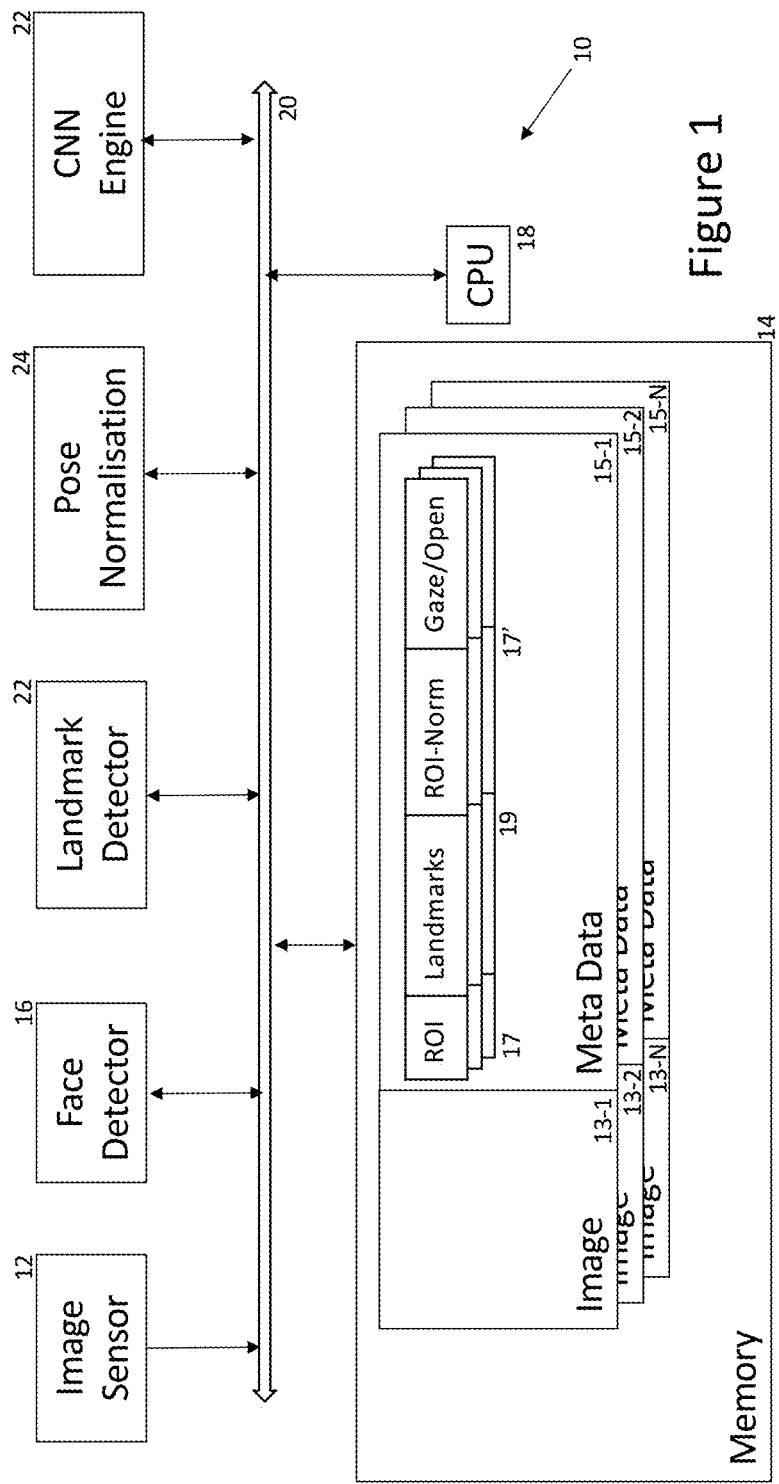
FIG. 1 shows a neural network image processing apparatus according to an embodiment of the present invention.

Referring now to FIG. 1, there is shown a neural network image processing apparatus 10 according to an embodiment of the present invention. The apparatus 10 comprises an image sensor 12 for acquiring images 13-1 . . . 13-N which are subsequently stored in memory 14. Although not shown, the image sensor 12 can include or cooperate with an image processing pipeline for performing initial processing of a raw image such as colour balancing, distortion correction etc. Details of such pre-processing and distortion correction systems are disclosed in PCT Application WO2017/032468, European Patent No. EP3101622 and U.S. patent application Ser. No. 15/879,310, the disclosures of which are incorporated herein by reference.

Note that the image sensor need not be immediately connected to the remainder of the apparatus 10 and for example, the sensor 12 can provide images for processing by the remainder of the apparatus across any of a local area network, a personal area network, a wide area network and/or any combination of a wired or wireless network.

The image sensor 12 can provide acquired images 13-1 ... 13-N directly to memory 14 across a system bus 20 or the images 13-1 ... 13-N can be provided directly to a face detector module 16. Face detection within acquired images is well-known since at least US 2002/0102024, Viola-Jones with many optimisations and improvements made in such systems since then. Thus, the face detector module 16 can be a dedicated hardware module such as the engine disclosed in PCT Application WO 2017/108222, the disclosure of which is incorporated by reference, or the face detector can be implemented in general purpose software executing on a system CPU 18, or indeed the face detector 16 could be implemented using one or more convolutional neural networks (CNN) and executed on a dedicated CNN engine 26 such as described in PCT Application WO 2017/129325, and U.S. Application No. 62/592,665, the disclosures of which are incorporated herein by reference. Indeed, U.S. application No. 62/592,665 discloses a system including multiple neural network processing cores which can be configured to process multiple neural networks performing different tasks on the same or different images or image portions in parallel.

In any case, once the face detector module 16 has processed an image, any region of interest (ROI) 17 bounding a portion of the image containing a face is identified and this information can be stored in memory as meta data associated with the image 13-1 ... 13-N. This may simply comprise bounding box information for the ROI containing the face or as explained below, further information may be included in the meta data for the ROI 17. It will be appreciated that any given image may include a number of detected face regions—in the example, image 13-1 includes 3 ROI 17, and information relating to each of these may be stored as meta data associated with the image 13-1 and processed as and if required.

It will be appreciated that face regions may be detected within an image at one of a number of different scales and at one of a number of different orientations and it may be desirable to transform these detected face regions into a rectangular image crop with a given orientation and scale using techniques such as disclosed in PCT Application WO2017/032468. In this case, an image crop can be included in the ROI information 17 stored in association with the image 13-1 ... 13-N in memory 14.

Nonetheless, even with an image crop of a given orientation and scale, the detected face may be in a number of different poses within the crop, e.g. forward facing, looking up, down, left, right etc.

U.S. application Ser. No. 15/912,946 filed 6 Mar. 2018, the disclosure of which is incorporated herein by reference discloses tracking units for facial features with advanced training for natural rendering of human faces in real-time. A device receives an image of a face from a frame of a video stream, and based on the image, selects a head orientation class from a comprehensive set of head orientation classes. Each head orientation class includes a respective 3D model. The device determines modifications to the selected 3D model to describe the face in the image, then projects a model of tracking points (landmarks) of facial features in an image plane based on the 3D model. The device can switch among a comprehensive set of 35 different head orientation classes, for example, for each video frame based on suggestions computed from a previous video frame or from yaw and pitch angles of the visual head orientation. Each class of the comprehensive set is trained separately based on a respective collection of automatically marked images for that head orientation class.

Alternatively, libraries such as dlib are available for face landmark detection.

Figure 2:
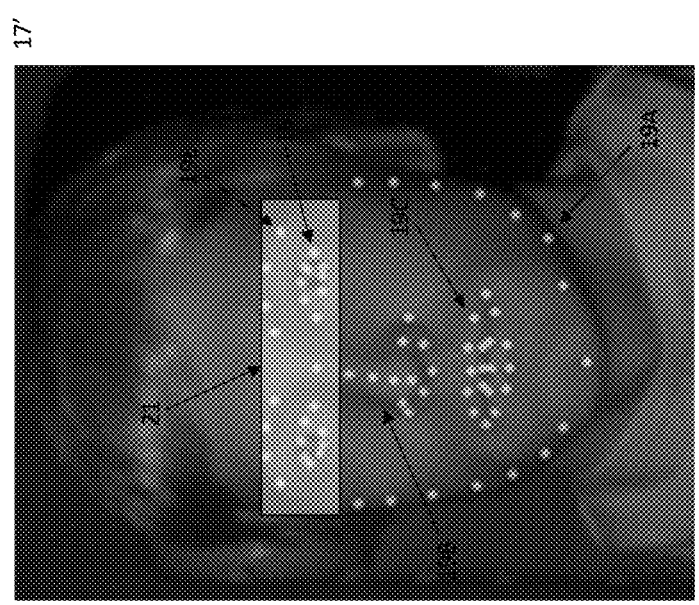
FIG. 2 illustrates a normalised face region derived from an image acquired by the system according to FIG. 1 along with facial landmarks and an eye region identified for the face region.

Such tools can be employed within a landmark detector 22 which produces a set of landmarks 19 for a given image crop containing a face region. FIG. 2 shows an image containing a face region where a number of landmarks have been identified. In this case, the landmarks indicate the jawline 19A, mouth region 19C, nose 19B, eyes 19D and eyebrows 19E of the subject. Note that the present apparatus is typically processing images and image crops of relatively low resolution so that it is typically not possible to explicitly locate or identify features on the eye of the user, for example, a pupil outline which in other applications can be useful for determining gaze angle.

Again, the landmark detector 22 can be implemented as a dedicated module, or the detector 22 can be implemented in general purpose software executing on a system CPU 18. Again, landmark information 19 can be stored in association with the ROI information 17 within the meta-data associated with a given image 13.

Now using the landmarks 19 identified in the original ROI 17, a pose normalisation module 24 can transform the ROI 17 into a face crop in a normalised pose—in this case front facing, such as the face region 17' shown in FIG. 2—and store this as ROI-Norm 17' in association with the original ROI 17.

It will be appreciated that this morphing process may result in an incomplete front facing face image, for example, where the original detected face was a side profile, but this does not necessarily prevent the remainder of the system from performing properly.

Now with the landmarks 19 of a transformed front facing image region an eye region 21 can be defined. In the example, the eye region extends from the highest eyebrow landmark 19E to a margin beyond the lowest eye landmark 19D and from a margin beyond the left-most eye or eyebrow landmark 19D,19E to a margin beyond the right-most eye or eyebrow landmark 19D,19E.

Figure 3:
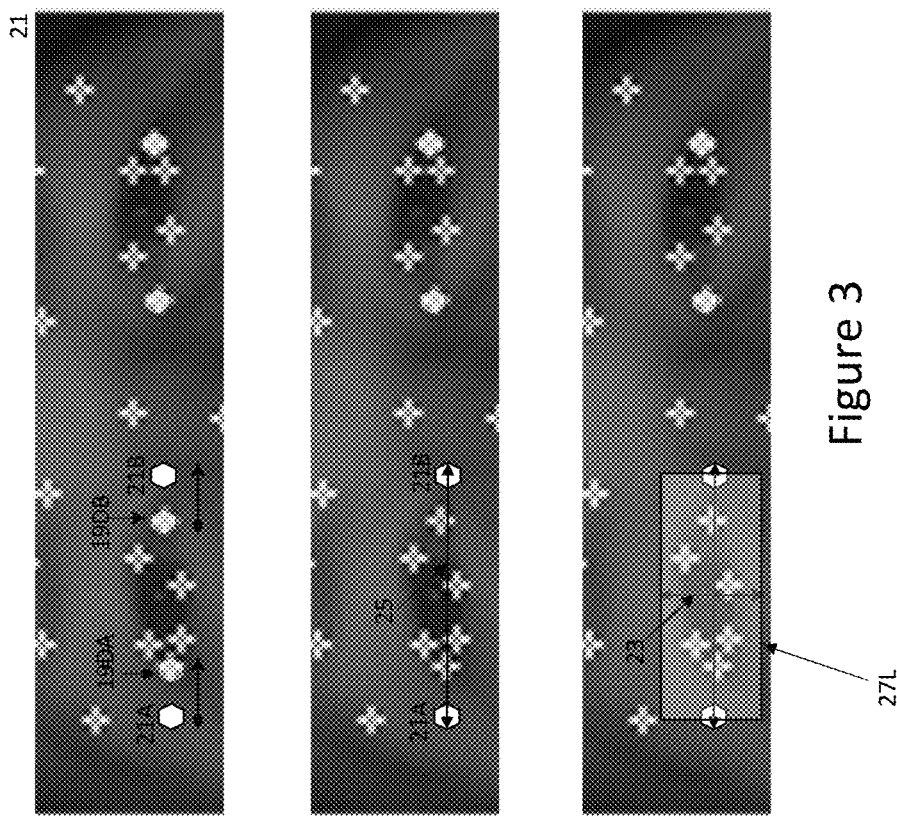
FIG. 3 illustrates the identification of individual eye regions based on the landmarks of FIG. 2.

Referring now to FIG. 3, within the eye region 21, for each eye (only detail for one eye is shown), the corners of the eye 19DA, 19DB are identified and then shifted by a margin away from the centre of the eye to indicate respective left and right boundary points 21A, 21B for each eye. The margin can be a percentage of the distance between corners 19DA and 19DB.

The distance between points 21A, 21B is multiplied by a fixed aspect ratio to determine a height 23 for an eye bounding box. The upper and lower boundary lines of the eye bounding box are centered about a line 25 extending between points 21A, 21B. (If there is a difference in height between eye corner locations 19DA, 19DB, the line 25 can be centred height wise between these locations. Now the defined eye regions (only the left region 27L is shown in FIG. 3) can be fed to a neural network as shown in FIG. 4 to simultaneously determine an eyelid opening value for each eye as well as the gaze angle (both pitch and yaw) for the pair of eyes.

Figure 4:
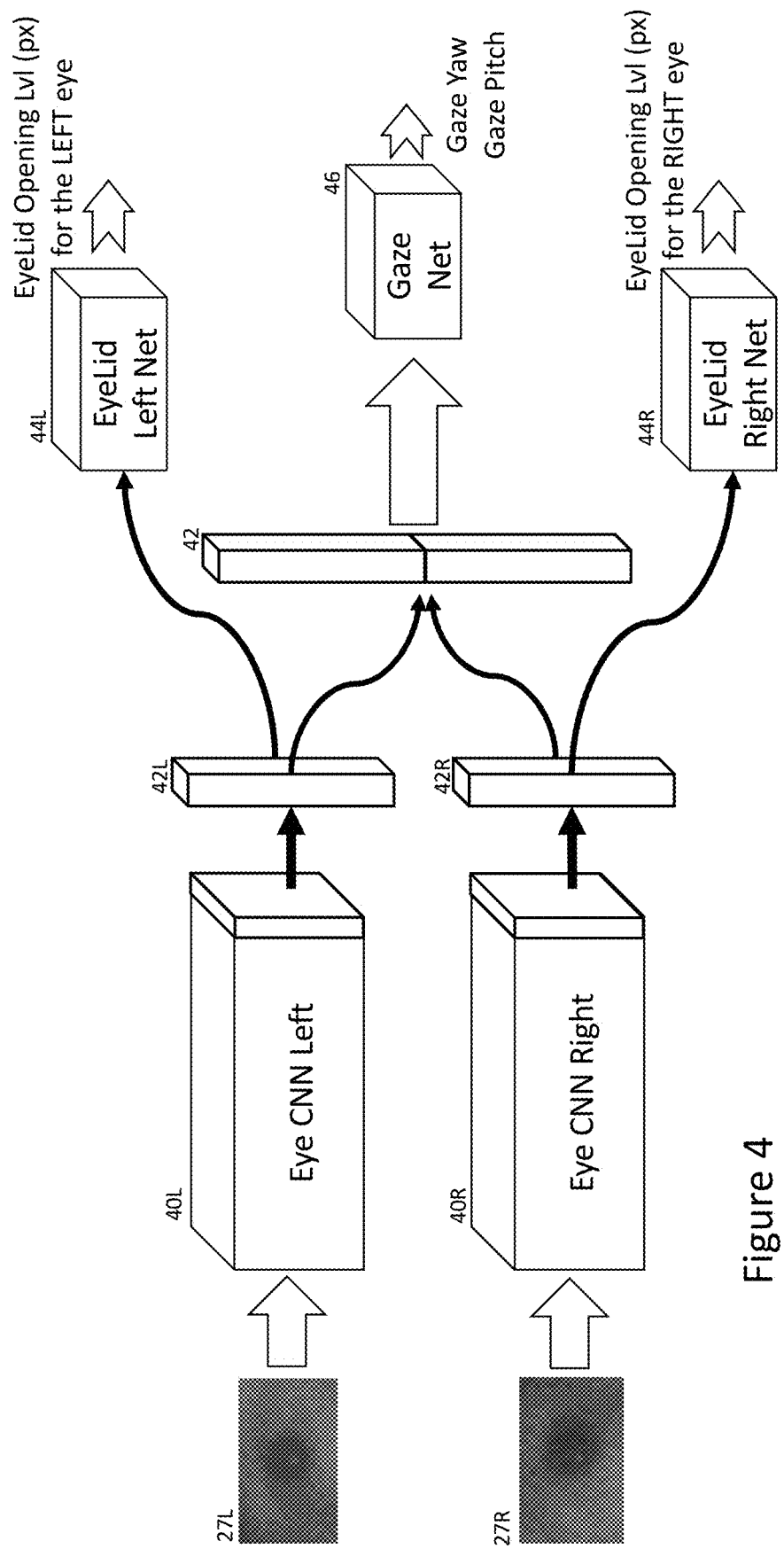
FIG. 4 illustrates the configuration of a convolutional neural network implemented with the system of FIG. 1 for identifying a gaze angle and eyelid opening for eye regions provided to the system.

FIG. 4 shows each eye region 27L, 27R fed to a respective CNN 40L, 40R. More specific details of the layers comprising each CNN 40L, 40R will be provided below, for the moment is it sufficient to note that the output layer 42L, 42R of each CNN 40L, 40R comprise a feature vector comprising a plurality of values, typically of the order of between 128 and 256 floating point values. Nonetheless, it will be appreciated that in alternative implementations, the feature vector may comprise fewer or more than these exemplary values. Note that the format of these values can be as disclosed in PCT Application WO 2017/129325 and U.S. application Ser. No. 15/955,426, the disclosures of which are incorporated herein by reference.

While each of the left and right feature vectors 42L, 42R can be fed to separate respective networks 44L, 44R, each for providing a measure of eyelid opening, the feature vectors are concatenated into a single feature vector 42 which is provided as an input layer to a gaze angle network 46. It will be appreciated that other mechanisms for combining the feature vectors 42L, 42R before or as they are fed to the gaze angle network 46 may be employed, for example, they could be supplied as separate input maps to an input layer of the network 46. In this regard, it should also be appreciated that the feature vectors 42L, 42R are not confined to comprising 1×M values and instead could comprise feature maps with A×B=M values.

The output layer each network 44L, 44R comprises an integer corresponding to number of pixels indicating a level of opening of a given eye.

The output layer of network 46 comprises a pair of numbers indicating a gaze horizontal angle (yaw) and gaze vertical angle (pitch) for the pair of eye regions 27L, 27R.

Figure 5:
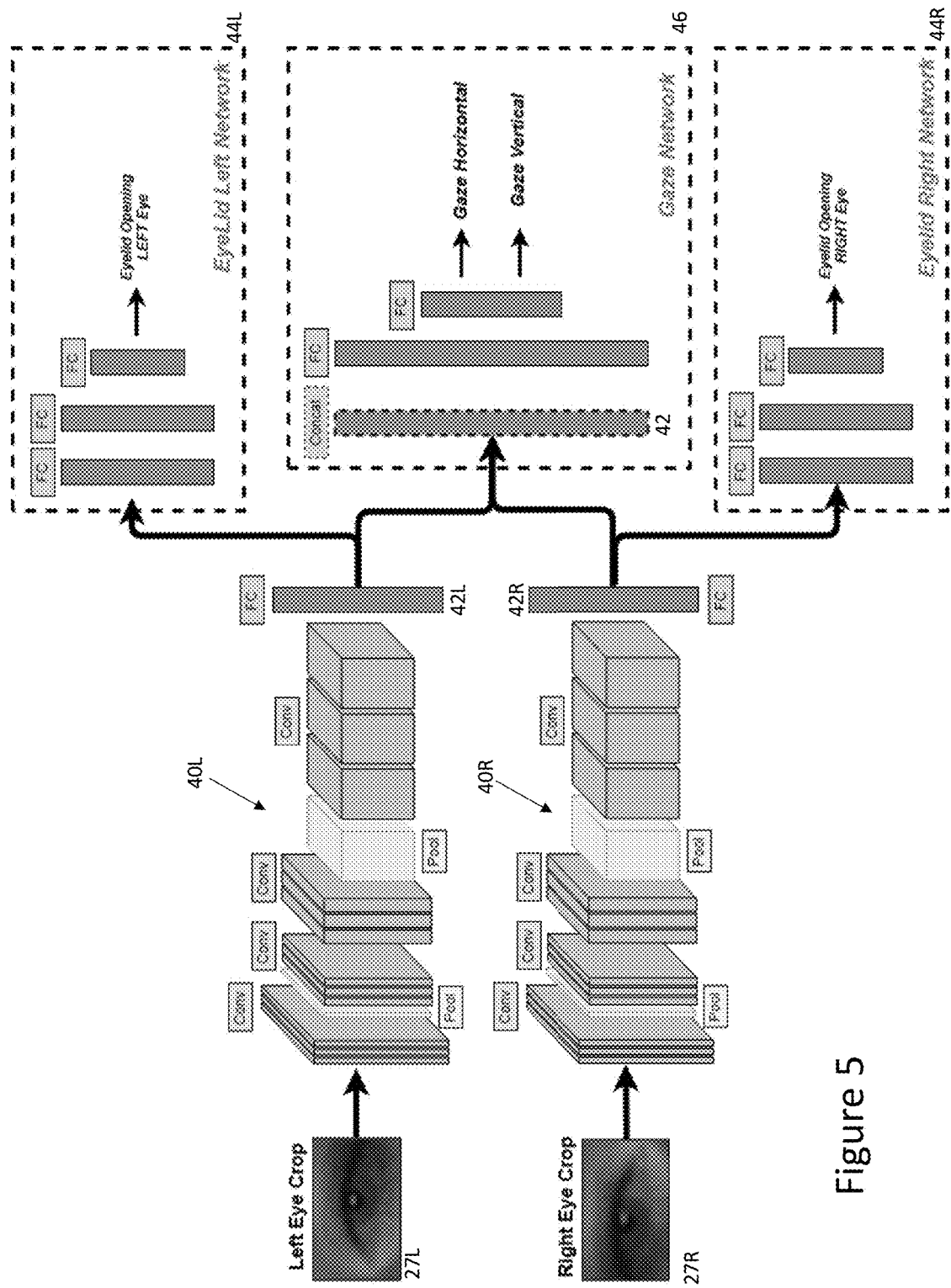
FIG. 5 shows the configuration of the convolutional neural network in more detail.

Referring now to FIG. 5, each of the CNNs 40L, 40R can comprise a number of convolutional layers (Cony) interleaved with pooling layers (Pool). In one example, each convolutional layer includes an activation function for example the ReLU function, as described in U.S. application Ser. No. 15/955,426, however, it will be appreciated that other activation functions such as PReLU could also be employed. The pooling layers can for example, comprise any of average or max pooling or alternatively functions such as peak as described in U.S. application Ser. No. 15/955,426. As an alternative or in addition to pooling layers, convolution layers with strides (steps) greater than one can be employed.

A final fully connected layer (FC) again including a ReLU activation function produces the output feature vectors 42L, 42R.

Each of the networks 44L, 44R and 46 need only comprise an input fully connected layer (whose nodes correspond with the values of the input feature vectors 42L, 42R and 42), again including a ReLU activation function and either a 2 node (in the case of network 46) or single node (in the case of networks 44L, 44R) output layer, again comprising an activation function such as ReLU.

Note that the values produced by the gaze network 46 need to be mapped back through the transformation based on the landmarks 19 and indeed any original rotation and/or scaling of the original ROI within the acquired image 13 to provide a meaningful gaze location in the coordinate space of the apparatus 10. This can be done either mathematically or using appropriate look-up tables.

It will be appreciated that with an appropriate common training set comprising labelled images including face regions with eyes at a variety of gaze angles and opening levels, the network illustrated in FIG. 5 can be trained jointly so that each network can boost the other.

The networks 44L, 44R and 46 can substantially simultaneously provide eyelid opening and gaze values for any region of interest 13 detected within an image and especially when implemented on a multi-processor core such as disclosed in US 2019/065410, results can readily be provided in real-time.

Nonetheless, it should be appreciated that it is not necessary to execute the gaze network 46 at the same frequency as the eyelid networks 44L, 44R and one may update more frequently than the other as required.

Variations of the above described embodiment are possible, so for example, it is not desirable to have either the processor 18 or 26 execute the gaze network 46 on images which do not contain eyes.

Thus, in variants of the described embodiments, a determination is made of the probability that a given image patch 27L, 27R is an eye patch. While any number of conventional approaches to doing so can be employed, in one variant, each the eyelid left and right networks 40-44L, 40-44R are extended to provide an additional "eyeness" output indicative of the probabilities for the left and right candidate eye patches 27L, 27R including an eye. The branches of the networks 40-44L, 40-44R producing this "eyeness" output can be trained at the same time as the remainder of the eyelid-opening networks 40-44L, 40-44R and the gaze network 46.

Now the execution of the gaze network 46 can be made conditional on the probabilities for the left and right candidate eye patches 27L, 27R including an eye. So, for example, if both left and right candidate eye patches 27L, 27R are non-eyes (possibly because of an anomalous output from the landmark detector 22), the gaze network 46 need not be executed.

It will be appreciated that the core structure of the above described embodiments can be extended to improve the accuracy of results provided.

One method for doing so involves emphasising the position of the pupil in each eye region and techniques for doing so in images which have been acquired from near infra-red (NIR) image sensors, e.g. sensors responsive to light in the region of around 850 nm to around 940 nm are described below.

As described in EP2778846, white pupil is an effect similar to red-eye in visible images, where an illuminating NIR light source, for example, an LED located close to an image sensor so forming a narrow angle with the sensor to the eye, causes the pupil region to appear as a saturated area in an image acquired under illumination from the NIR light source.

Thus, referring FIG. 6, in such embodiments, the image sensor 12 is sensitive to NIR wavelengths and the system 10 is provided with at least a first NIR light source 50 located close enough to the image sensor 12 that when a subject close enough to the image sensor is illuminated by the first light source during image capture, the area of the image corresponding to the subject's pupils will tend to comprise saturated values.

The system may further comprise a second NIR light source 52, which may comprise an LED of the same type as the first NIR light source, but disposed far enough away from the image sensor 12 that when a subject is illuminated by the second light source during image capture, the area of the image corresponding to the subject's pupils does not tend to comprise saturated values.

For driver monitoring systems with typical distances of subjects to the camera in the range 500 mm to 1000 mm and on average about 750 mm, the center-to-center distance of the first NIR light source 50 to the centre of the image sensor 12 can be approximately 10 mm; whereas the center-to-center distance of the second NIR light source 52 to the centre of the image sensor 12 can be at least 35 mm.

Thus, subjects captured in images under the illumination of the first light source 50 tend to exhibit white pupils, while subjects captured in images under the illumination of the second light source 52 tend not to exhibit white pupils.

It will be appreciated that subjects which are more distant from the image sensor 12 will tend to exhibit white pupil, however, the effect is reduced by noise and that the intensity of illumination of the subject's face will decrease with the increase of the distance. As such, the intensity of the light source 50 needs to be sufficient to produce a white pupil effect at the range of subject distances of concern, whereas the intensity of the light source 52 needs to be sufficient only to properly illuminate the face at the range of subject distances of concern without unduly saturating pixels.

It will also be appreciated that while "white pupil" is an effect which occurs regardless of ambient illumination levels; however, it is more evident at night when there is less visible light and a subject's pupils tend to be dilated.

As such, in some embodiments, an ambient light sensor 66 can be provided and this light level information can be used to boost the performance of the networks described below.

In any case, using the system of FIG. 6, images are captured alternatively by the image sensor 12 under the illumination of the light source 50 and the light source 52. Images are paired so that one image A of the pair comprises an image captured under the illumination of the light source 50 at a time as close as possible to the other image B captured under the illumination of the light source 52 to minimize loss of alignment between the pair of images. (Nonetheless, small alignment errors can be corrected in a conventional fashion.)

Figure 8:
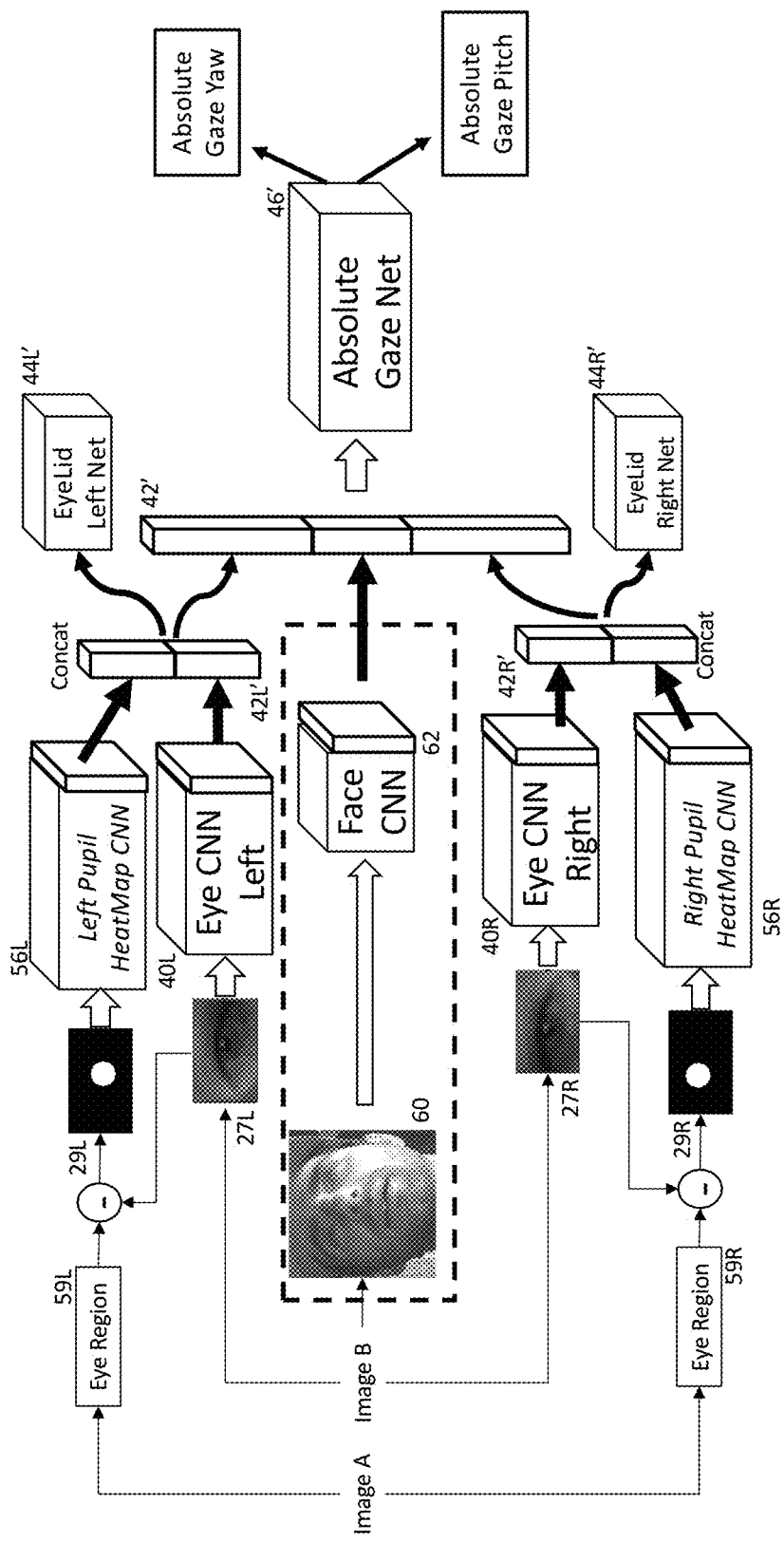
FIG. 8 illustrates a network operable with the image sensor of FIG. 6.

Now referring to FIG. 8, the image B of the pair captured under the illumination of the light source 52 is processed as described previously and left and right eye regions 27L, 27R extracted from the image B are processed by the Eye CNN networks 40L, 40R to produce respective feature vectors.

In one implementation, the other image A of the pair captured under the illumination of the light source 50 is also processed in the same manner as image B to provide a pair of eye regions 59L, 59R which exhibit white pupils and where the white pupils are aligned with the pupils for the eye regions 27L, 27R.

The image information for eye regions 27L, 27R extracted from image B is subtracted from the information for eye regions 59L, 59R extracted from image A to provide a pair of filtered eye region images 29L, 29R where the background is suppressed and the pupil area highlighted.

While this information could be used directly, in the embodiment shown in FIG. 8, the filtered eye region images 29L, 29R are fed to respective networks 56L, 56R which are configured to extract deep, abstract features from respective heat maps for the left and right filtered eye region images.

Examples of networks producing heatmaps are disclosed in A. Newell, K. Yang, and J. Deng, "Stacked hourglass networks for human pose estimation", In Proceedings of the European Conference on Computer Vision, pages 483-499. Springer, 2016; and S. Zafeiriou, G. Trigeorgis, G. Chrysos, J. Deng and J. Shen, "The Menpo Facial Landmark Localisation Challenge: A step closer to the solution", CVPRW, 2017.

The heatmap information can then be concatenated with the feature vectors, produced by the networks 40L, 40R to provide concatenated feature vectors 42L', 42R'.

These concatenated feature vectors 42L', 42R' can then be fed to respective suitably adapted eyelid opening networks 44L', 44R' which will provide improved output vis-à-vis the networks of FIG. 4.

This output can be further improved by supplementing either the input for the networks 56L, 56R or the networks 44L',44R' with an ambient light level provided from the sensor 66 for the acquisition time of image A.

The network of FIG. 4 can be further extended by providing a face region 60 directly from image B through a face CNN 62. The face CNN 62 can be configured and trained to provide deep, abstract features of the face. These features can encode a pose and orientation for the face region 60 in image B which are later used to estimate the absolute gaze of the subject.

The face feature vector output from the face CNN 62 can in turn be concatenated with the concatenated outputs 42L', 42R' from the networks 40L, 40R, 56L and 56R before being fed to a gaze network 46' adapted for this new input, but nonetheless producing the same outputs as previously.

The face feature vector from the face CNN 62, encoding head pose and orientation, enables the gaze network 46' to take advantage of correlation between the white pupil effect and head orientation angles and gaze angles.

Referring back to FIG. 7, in a variation of the system shown in FIG. 6, a pair of sensors 12A, 12B are provided. Sensor 12A is an NIR sensitive image sensor and is again located close enough to illumination source 50 that when images are captured by sensor 12A under illumination by source 50, eye regions tend to exhibit a white pupil. Second sensor 12B is provided with a view to capturing images at the same time as images captured by sensor 12A, but which do not exhibit a white pupil. This can be as a result of simply positioning the sensor 12B further away from source 50 than sensor 12A—in this case, a second light source 52 would not be required.

In other embodiments, sensor 12B can be sensitive to different wavelengths than sensor 12A and so when capturing images, the subjects may need to be actively illuminated with a second light source 52 located sufficiently distant from sensor 12B that eye regions within those images do not exhibit white pupil.

While sensor 12B may be sensitive to IR wavelengths different from those of sensor 12A/light source 50, the sensor 12B could for example comprise an RGB sensor and the light source 52, for example, a white LED, would need to be located sufficiently distant from sensor 12B that eye regions within those images do not exhibit red eye.

In any case, a pair of images A, B can be captured by sensor 12A and 12B simultaneously.

Figure 9:
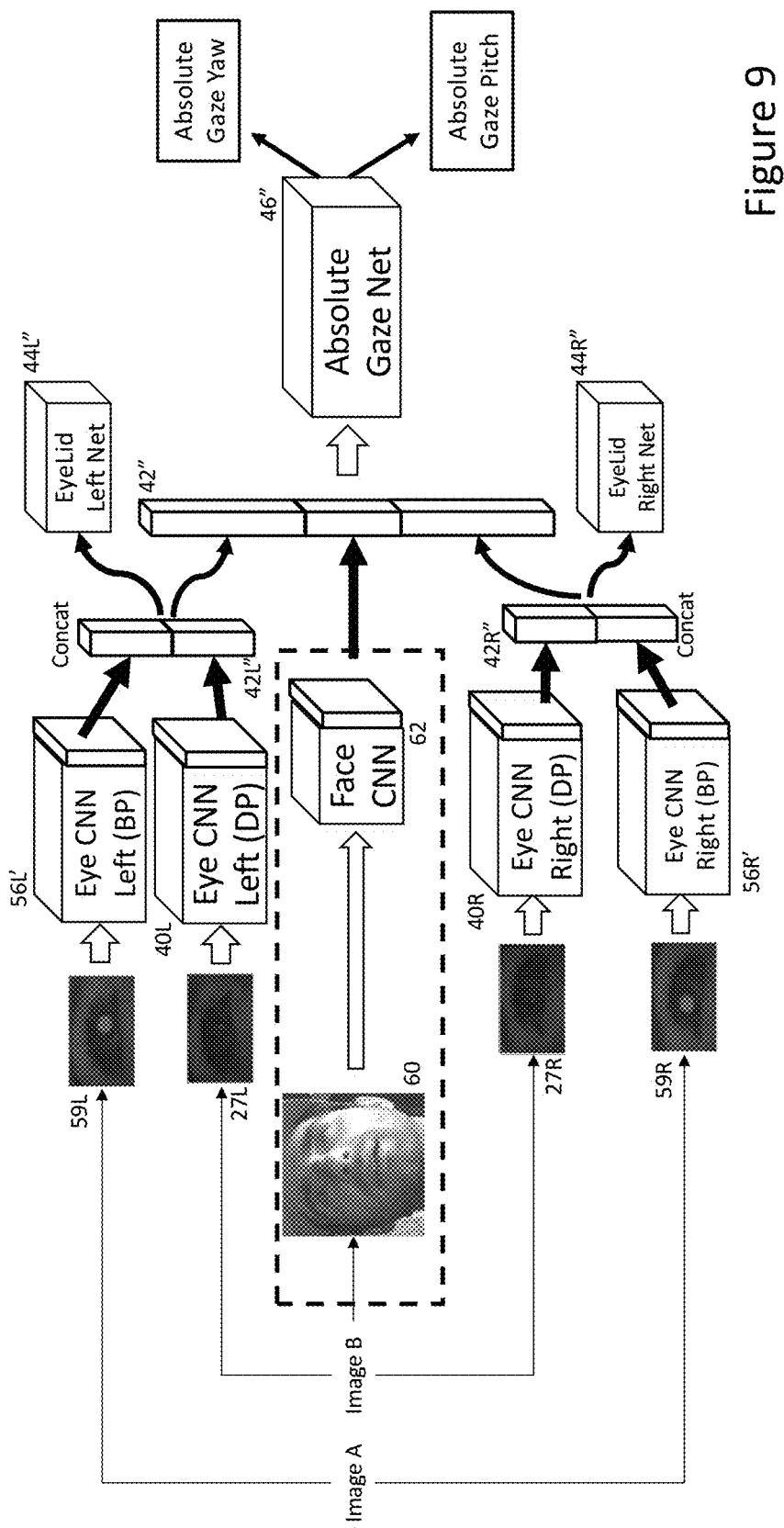
FIG. 9 illustrates a network operable with the image sensors of FIG. 7.

Referring now to FIG. 9, in this case, because sensors 12A and 12B are separated, even if image A acquired from sensor 12A is processed in the same manner as image B, the pupil regions within the pairs of eye regions 27L, 59L and 27R, 59R will not be aligned and so in this implementation the information from the eye regions 27L, 27R extracted from image B is not subtracted from the eye regions 59L, 59R—the former are fed directly to respective convolution networks 56L', 56R' whose outputs are again concatenated as in FIG. 7 with the outputs of networks 40L, 40R to produce feature vector 42" which is fed to gaze network 46". Again, pose and orientation information encoded in the face feature vector extracted from face region 60 can boost the performance of that network. Equally, information from light sensor 66 can be used to boost the performance of networks 56L', 56R' and/or eyelid networks 44L", 44R".

Further information could also be used to boost the performance of the above described networks including for example using knowledge of the projection parameters for the camera(s) used to acquire image A or B and the separation between the pupils centers within the face region in any given image to determine an approximate distance to the subject in that image. This distance value could then be used as an addition input to any of the networks within the overall system.

Further information which can be incorporated within the above described networks could indicate if a subject is wearing eye glasses or not. Thus, a classifier configured to provide such an output could again help to boost the performance of the networks eyelid networks 44L, 44R, 44L', 44R', 44L", 44R".

Alternatively, this information could be used in the eyeness network referred to above to provide an output indicating if eyes are visible in images A and B and to avoid executing the gaze networks 46' 46" if eyes are not present in the images.

In a variation of FIG. 8, eye regions 29L and 27L could be fed as two separate channels to a common CNN, rather than separate CNNs 56L, 40L and similarly for eye regions 29R and 27R.

Similarly, in a variation of FIG. 9, eye regions 59L and 27L, on the one hand, and 59R and 27R, on the other hand, could be fed as separate channels into respective common eye CNNs.

In still further variants of FIGS. 6 and 7, a single image sensor (not shown) with a Bayer pattern of pixels comprising sub-pixels sensitive to the separate wavelengths of light sources 50, 52 could be employed, so allowing images A and B to be simultaneously acquired, but without losing alignment.

The invention claimed is:

1. A neural network image processing apparatus arranged to acquire one or more images from an image sensor, the apparatus comprising:
    a face detector, configured to identify at least one region of interest containing a face region in at least one of said one or more images;
    a landmark detector, configured to determine a plurality of facial landmarks in a face region within one of said at least one region of interest;
    a pose normalisation module, configured to use said plurality of said facial landmarks to transform said face region within said region of interest into a transformed face region having a given pose; and
    one or more processors, configured to:
        use transformed landmarks within said transformed face region to identify a pair of eye regions within said transformed face region;
        feed each identified eye region of said pair of eye regions to a respective first and second convolutional neural network, each of said first and second convolutional neural networks being configured to produce a respective feature vector comprising a plurality of numerical values;
        feed each feature vector to respective first and second eyelid opening level neural networks to obtain respective measures of eyelid opening for each eye region; and
        feed each feature vector either as a concatenated vector or as separate input maps to a gaze angle neural network to generate gaze yaw and pitch values with the measures of eyelid opening, wherein said first and second convolutional neural network, first and second eyelid opening and gaze angle neural networks are jointly trained based on a common training set.

2. The apparatus according to claim 1 further comprising a multi-processor neural network core which substantially simultaneously processes layers from said first and second convolutional networks and which substantially simultaneously processes layers from said first and second eyelid opening and gaze angle neural networks.

3. The apparatus according to claim 1 wherein each of said feature vectors comprises a plurality of floating point numbers.

4. The apparatus according to claim 3 wherein each of said feature vectors comprise at least 128 32-bit floating point numbers.

5. The apparatus according to claim 1 wherein said given pose is a front facing pose.

6. The apparatus according to claim 1 wherein said pair of eye regions include an area including any eye related or eyebrow related landmarks.

7. The apparatus according to claim 1 wherein said pair of eye regions are rectangular.

8. The apparatus according to claim 7 wherein said pair of eye regions have a fixed aspect ratio.

9. The apparatus according to claim 1 wherein each of said first and second convolutional neural networks comprises respective combinations of convolutional and pooling layers.

10. The apparatus according to claim 9 wherein each convolution layer includes an activation function.

11. The apparatus according to claim 1 wherein said gaze angle network comprises only fully connected layers.

12. The apparatus according to claim 1 wherein said first and second eyelid opening networks comprise only fully connected layers.

13. The apparatus according to claim 1 wherein said landmarks delineate any combination of a face region: jaw, mouth, nose, eyes or eyebrows.

14. The apparatus according to claim 1 wherein said landmarks do not delineate any feature on an eye.

15. The apparatus according to claim 1 wherein said feature vectors comprise either 1×M or A×B=M values, where A, B and M are integers.

16. The apparatus according to claim 1 further comprising a first light source located within a distance from said image sensor to cause eye regions in first images of subjects captured under illumination from said first light source to contain saturated regions corresponding to locations of pupils within said eye regions; and a second light source located at a greater distance from said image sensor than said first light source to cause eye regions in second images of subjects captured under illumination from said second light source not to contain saturated regions corresponding to the locations of pupils within said eye regions.

17. The apparatus according to claim 16 wherein said image sensor comprises a single image sensor and wherein said first and second light sources comprise separate light sources, and wherein said one or more processors is configured to subtract eye region information derived from one of said second images from corresponding eye region information derived from one of said first images acquired at a time similar to an acquisition time of said one of said second images to provide filtered eye region information, said one or more processors being configured to further process said filtered eye region information before combining as combined feature vectors said processed filtered eye region information with feature vector information produced from the eye regions derived from said one of said second images before feeding said combined feature vectors to respective first and second eyelid opening level neural networks.

18. The apparatus according to claim 16 wherein said image sensor comprises separate image sensors at respective distances from said first and second light sources, and wherein said one or more processors is configured to process eye region information derived from one of said first images simultaneously acquired with one of said second images to provide processed eye region information, said one or more processors being configured to combine as combined feature vectors said processed eye region information with feature vector information produced from the eye regions derived from said one of said second images before feeding said combined feature vectors to respective first and second eyelid opening level neural networks.

19. The apparatus of claim 18 wherein said first and second light sources comprise a common light source and wherein said image sensor comprises separate sensors for acquiring said first and second images.

20. The apparatus of claim 18 wherein said first and second light sources are configured to illuminate at separate wavelengths.

21. The apparatus according to claim 16 wherein said image sensor comprises a single image sensor and wherein said first and second light sources comprise separate light sources, and wherein said one or more processors is configured to subtract eye region information derived from one of said second images from corresponding eye region information derived from one of said first images acquired at a time similar to an acquisition time of said one of said second images to provide filtered eye region information, said one or more processors being configured to combine as combined information said filtered eye region information and the eye regions derived from said one of said second images before processing said combined information to provide said feature vectors for respective eyes.

22. The apparatus according to claim 16 wherein said image sensor comprises separate image sensors at respective distances from said first and second light sources, and wherein said one or more processors is configured to combine eye region information derived from one of said first images simultaneously acquired with one of said second images with feature vector information produced from the eye regions derived from said one of said second images to provide combined eye region information, said one or more processors being configured to process said combined eye region information to provide said feature vectors for respective eyes.

23. The apparatus of claim 16 wherein said image sensor is sensitive to infra-red light and at least said first light source is configured to emit light at an infra-red wavelength.

24. The apparatus of claim 1 wherein said one or more processors are configured to provide face information encoding one or more of: a pose; or an orientation for a subject face in said face region and to combine said face information with said feature vectors fed to said gaze angle neural network.

25. A method comprising:
identifying a region of interest containing a face region in an image;
determining a plurality of facial landmarks in the face region of said region of interest;
transforming, based at least in part on said plurality of said facial landmarks, said face region within said region of interest into as a transformed face region having a given pose;
identifying, based at least in part on transformed landmarks within said transformed face region, a pair of eye regions within said transformed face region;
feeding each identified eye region of said pair of eye regions to a respective first and second convolutional neural network, each network configured to produce a respective feature vector comprising a plurality of numerical values;
feeding each feature vector to respective first and second eyelid opening level neural networks to obtain respective measures of eyelid opening for each eye region; and
feeding each feature vector either as a concatenated vector or as separate input maps to a gaze angle neural network to generate gaze yaw and pitch values with the measures of eyelid opening, wherein said first and second convolutional neural network, first and second eyelid opening and gaze angle neural networks are jointly trained based on a common training set.

* * * * *